United States Patent [19]

Worthing

[11] 4,438,968

[45] Mar. 27, 1984

[54] DEFLECTING DEVICE FOR TRUCK LOAD

[76] Inventor: Ralph Worthing, P.O. Box 715, Kamloops, B. C., Canada, V2C 5L7

[21] Appl. No.: 354,330

[22] Filed: Mar. 3, 1982

[30] Foreign Application Priority Data

Apr. 2, 1981 [CA] Canada .................................. 374486

[51] Int. Cl.³ ............................................ B62D 25/00
[52] U.S. Cl. ................................... 296/1 R; 280/770; 105/374
[58] Field of Search ............... 296/1 R, 182; 280/770, 280/423 R; 105/374

[56] References Cited

U.S. PATENT DOCUMENTS 3,047,161  7/1962  Thacker .............................. 280/770
3,049,363  8/1962  Marx .................................. 280/748
3,493,263  2/1970  Brown ................................ 296/182

Primary Examiner—Robert R. Song
Attorney, Agent, or Firm—Lawrence I. Field

[57] ABSTRACT

A deflecting device for deflecting the load of a trailer, consisting of a plate vertically positioned across the front of a trailer for pivotal movement about a vertical pivot at one side of the trailer.

5 Claims, 4 Drawing Figures

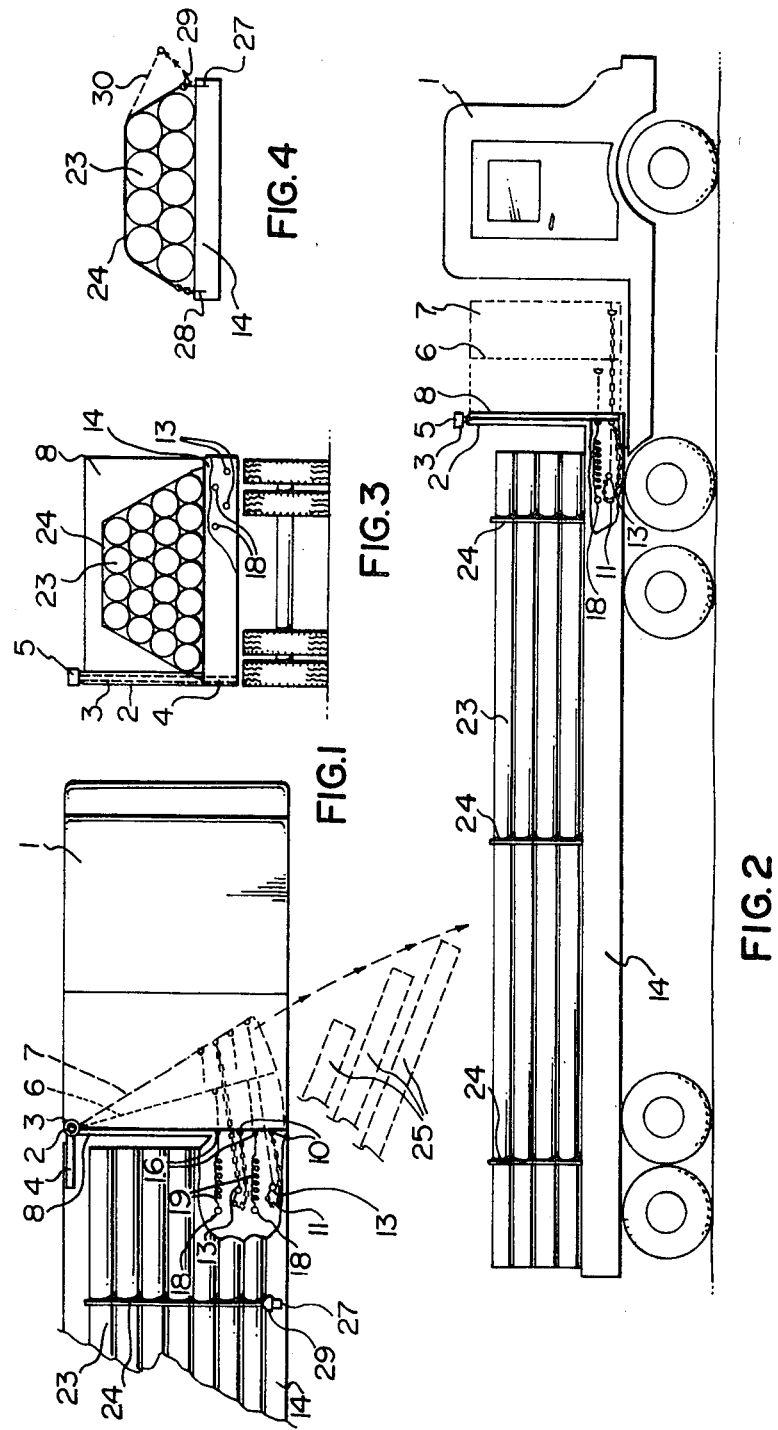

DEFLECTING DEVICE FOR TRUCK LOAD

This invention relates to a device for deflecting a moving load on a trailer bed so that the load will not impinge the tractor cab.

BACKGROUND OF THE INVENTION

In the transport of articles by highway on a flat bed trailer, there is the continual problem of being able to satisfactorily securing the load upon the trailer so that it will not become dislodged. The normal method is to use hold down chains which are secured to the bed of the trailer, pass over the load, and are tightened with a toggle arrangement or a simple winch mechanism. However, when transporting certain kinds of load such as pipe, the resistance to longitudinal movement of the pipe upon the trailer is quite low. There is therefore a great tendency for the pipe to move through the chains when the trailer is decelerated and it is known for such pipes to pierce the cab often with fatal consequences for the driver. This is a very real problem in the transport of pipes by highway as it must be taken into consideration that these trucks frequently operate on poorly developed roads having very steep grades, sharp turns and soft shoulders and there is no protection for the driver in the cab of the tractor to prevent pipes from piercing the cab. The situation is particularly dangerous during the winter months when the pipes are covered with frost and there is no possible way to positively hold them in position with tie down chains no matter how much tension is placed upon the chains.

In an attempt to overcome this problem and divert a moving load away from a tractor cab, it has been suggested that a snowplow shaped deflector be fastened onto the back of the cab. Such a deflector is disclosed in Canadian Patent No. 687,611. The device in this patent will however not function satisfactorily and is not used in the industry. This patented deflector it will be noted is secured to a cab, however the light metal of a cab will never carry the weight of a shield of adequate strength to give protection against a piece of pipe weighing perhaps several tons shooting forward ten or twelve feet from a trailer load. Also, the fact that the shield is divided in the middle would provide no protection whatsoever if a large diameter pipe hit the shield at its mid point. This type of accident would just crush the shield and the cab together. In addition to the fact that the shield could not be strong enough to provide reasonable protection when it is mounted on the cab as shown in this patent, it eliminates the drivers full "rear window view" of his load and of his winch, so making the mere hooking up of the trailer to the tractor unit a more difficult operation and also preventing direct viewing of the load when winching. Furthermore, the device in the patent takes up the space which is normally used in a pipe carrying tractor trailer unit to accommodate the winch, chains and further paraphernalia which are used with the loading and unloading of this type of load. There is also the possibility with this prior art patented device that, due to the distance between the load and the deflector, during deceleration on a steep hill, a pipe could slide forwardly and jam into the deflector so holding the cab and trailer in a rigid position and preventing steering of the tractor. A dangerous situation could therefore quite easily be encountered. Finally, if the deflector of the patent did deflect a load which was sliding forwardly, part would be deflected off the road and part would be deflected into the path of oncoming traffic. This would also create a dangerous situation.

SUMMARY OF THE INVENTION

The deflecting device of this invention consists of a steel panel which is hinged about a vertical hinge at one side of a trailer bed. The panel is held in a transverse position on the trailer bed by springs such that when the load or part of it contacts the panel during deceleration of the truck, the panel pivots from one side of the trailer and deflects the load towards the other side eventually deflecting the load to one side of the cab of the tractor if the deceleration is of a large amount.

BRIEF DESCRIPTION OF THE DRAWINGS

This invention will now be described with reference to the attached drawings in which FIG. 1 is a diagrammatic plan view of the front end of a trailer and a tractor showing a preferred embodiment of the deflecting device of this invention, FIG. 2 is a diagrammatic view of a tractor trailer unit including the deflecting device as shown in FIG. 1, FIG. 3 is a front elevational view of the trailer of FIG. 2, and FIG. 4 is a diagrammatic rear view of a trailer bed showing a quick release hold down chain.

DETAILED DESCRIPTION OF PREFERRED EMBODIMENTS

Referring to the drawings there is shown a tractor cab 1 coupled to a flat bed trailer 14 in the usual manner through a fifth wheel (not shown). The trailer has secured thereto a load of pipes 23 which are held in place by chains 24. Each chain is secured with regular tie downs 28 except for the foremost chain which is secured with a regular tie down 28 and a tie down 27 having an open outwardly extending retaining lip over which a ring 29 on the end of the chain passes. If a large transverse force is applied to the right hand side of the foremost chain hold down as shown in FIG. 4 then the ring 29 on the chain will unhook from tie down 27 and the chain will swing to the position 30 as shown in dotted lines.

At the front end of the trailer a vertical solid steel pipe 3 is secured as by welding on other means rigidly to the trailer through a reinforcement 4. A steel pipe 2 is placed over the pipe 3 and a steel plate 8 is welded or otherwise secured to the pipe 2 so that the plate is pivotal about a vertical axis about pipe 3. A cap 5 is screwed or attached by other means to the top of pipe 3. The plate 8 is held in position across the trailer by springs 19 which are secured between anchor points 18 on the trailer and anchor points 16 on the plate. Flexible inextensible restraining means such as chains 11 and 12 are secured loosely between anchor points 13 on the trailer and anchor points 10 on the plate.

It will thus be seen that when the tractor trailer unit is proceeding along the highway and is forced to decelerate, if the pipes 23 break loose and slide through the chains 24, they first hit the steel plate 8 which pivots against the tension of the springs 19 to possibly a position 6 as shown in dotted lines in FIG. 1. The pipes will then tend to move transversely at their front ends and the front chain will unhook from its tie down 27 so permitting transverse movement of the pipes at their front ends. Further forward movement of the pipes will move the steel plate 8 to position 7 as shown in dotted lines, at which time transverse movement of the pipes will have taken place and the pipes will slide forwardly past one side of the cab 1 as shown by dotted lines 25. The position 7 of the steel plate 8 is the maximum position through which the plate will pivot as it will then be retained in the position by chains 11 and 12.

It will thus be seen that the deflecting device of this invention positively moves longitudinally moving pipes on a trailer towards one side of the trailer and deflects them so that they will not impinge upon the cap of the tractor.

Various other modifications of the device can be made within this invention, the scope of the modifications being determined by the following claims.

I claim:

1. A deflecting device for deflecting the load of a trailer, consisting of a plate vertically positioned across the front of the trailer for pivotal movement about a vertical pivot at one side of the trailer and restraining means between the trailer and the plate for limiting the amount of pivoting of the plate.

2. The device of claim 1, including a spring between the trailer and the plate for resiliently biasing the plate against pivoting.

3. The device of claim 1, wherein the restraining means is a flexible inextensible means.

4. The device of claim 3 wherein the flexible means are chains.

5. The device of claim 1 wherein the vertical pivot consists of a first tube secured to the trailer, and a second tube extending over the first tube, the plate being secured by a vertical edge to the second tube.

* * * * *